United States Patent
Lee (10) Patent No.: US 9,195,571 B2
(45) Date of Patent: Nov. 24, 2015

(54) AUTOMATIC TESTING APPARATUS FOR EMBEDDED SOFTWARE, AUTOMATIC TESTING METHOD THEREOF AND TEST SCENARIO COMPOSING METHOD

(71) Applicant: SAMSUNG ELECTRONICS CO., LTD., Suwon-si, Gyeonggi-do (KR)

(72) Inventor: Byeong-hu Lee, Hwaseong-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 40 days.

(21) Appl. No.: 14/044,259

(22) Filed: Oct. 2, 2013

(65) Prior Publication Data
US 2014/0123117 A1    May 1, 2014

(30) Foreign Application Priority Data
Oct. 26, 2012    (KR) .................. 10-2012-0119586

(51) Int. Cl.
| | |
|---|---|
| G06F 11/34 | (2006.01) |
| G06F 11/36 | (2006.01) |
| G06F 9/44 | (2006.01) |
| G06F 9/45 | (2006.01) |
| G06F 17/28 | (2006.01) |
| G06F 3/00 | (2006.01) |

(52) U.S. Cl.
CPC ........ G06F 11/3672 (2013.01); G06F 11/3684 (2013.01); G06F 11/3688 (2013.01); G06F 11/3692 (2013.01); G06F 3/00 (2013.01); G06F 8/20 (2013.01); G06F 8/433 (2013.01); G06F 11/34 (2013.01); G06F 17/28 (2013.01)

(58) Field of Classification Search
None
See application file for complete search history.

(56) References Cited

U.S. PATENT DOCUMENTS

2006/0132297 A1* 6/2006 Carver et al. ............... 340/500
2007/0168990 A1* 7/2007 Alshab et al. ............... 717/127
(Continued)

FOREIGN PATENT DOCUMENTS

| KR | 10-2008-0052341 | 6/2008 |
|---|---|---|
| KR | 10-2010-0041447 | 4/2010 |
| WO | WO 2007/137082 | 11/2007 |

OTHER PUBLICATIONS

Extended European Search Report dated Dec. 3, 2013 from European Patent Application No. 13188768.9 (eight pages).
(Continued)

*Primary Examiner* — Don Wong
*Assistant Examiner* — Shirin Alizadeh
(74) *Attorney, Agent, or Firm* — Staas & Halsey LLP (57) ABSTRACT

An automatic test apparatus for embedded software, an automatic testing method thereof and a test scenario composing method may be used to detect an unpredictable problem as well as a predictable problem that may occur under user's conditions and reproduce various events. The automatic testing apparatus may include a keyword composer which extracts a keyword from status information output by executing the embedded software, and composes a keyword list using the extracted keywords, an output analyzer which analyzes the output from the execution of the embedded software based on the composed keyword list, a control command generator which loads at least one scenario previously stored in accordance with the analysis results, and generates an instruction list corresponding to a predetermined event status, and a test processor which processes the embedded software to reproduce the event status based on the generated instruction list.

26 Claims, 5 Drawing Sheets

(56) References Cited

U.S. PATENT DOCUMENTS

2008/0010539 A1* 1/2008 Roth .................................. 714/38
2011/0214058 A1* 9/2011 Duffie et al. ...................... 715/704
2013/0185056 A1* 7/2013 Ingram et al. ....................... 704/9

OTHER PUBLICATIONS

T. Pajunen et al., "Model-Based Testing with a General Purpose Keyword-Driven Test Automation Framework", 2011 Fourth International Conference on Software Resting, Verification and Validation Workshops (ICSTW), XP31895114, Mar. 21, 2011, pp. 242-251.

C. Woskowski et al., "Applying Industrial-Strength Testing Techniques to Critical Care Medical Equipment", SAFECOMP 2012, XP47016686, Sep. 25, 2012, pp. 62-73.

U.S. Appl. No. 14/044,296, filed Oct. 2, 2013, Byeong-hu Lee, Samsung Electronics Co., Ltd.

\* cited by examiner

AUTOMATIC TESTING APPARATUS FOR EMBEDDED SOFTWARE, AUTOMATIC TESTING METHOD THEREOF AND TEST SCENARIO COMPOSING METHOD

CROSS-REFERENCE TO RELATED APPLICATIONS

This application claims priority from Korean Patent Application No. 10-2012-0119586, filed on Oct. 26, 2012 in the Korean Intellectual Property Office, the disclosure of which is incorporated herein by reference.

BACKGROUND

1. Field

Apparatuses and methods with respect to the exemplary embodiments disclosed herein relate to an automatic test apparatus for embedded software, an automatic testing method thereof and a test scenario composing method, and more particularly to an apparatus and method for automating an operation test for embedded software installed in a digital device.

2. Description of the Related Art

With the emergence of television (TV), mobile phones, or like various digital devices, embedded software installed in such devices have become vast and various. A variety of devices provides various execution environments for the embedded software installed in the respective devices, and may cause error cases or situations. Thus, the embedded software has to be previously tested in consideration of error cases or circumstances that may arise in executing the embedded software.

Under a host environment, before porting to a target corresponding to a real condition, the embedded software is tested in accordance with various user scenarios based on many cases. The scenario unfolded under the host environment can be reproduced under the target environment.

Since the embedded software has to be ported to and operate in the target having various hardware characteristics and software environments and operates, repetitive test procedures are needed to secure stability in a new environment.

Among such test methods, there is a conventional test method using a commercialized automated test tool for unidirectional transmission of a command to the embedded software. The method of using the automated test tool can perform analysis only if the embedded software is previously defined with respect to a forecasted status. Therefore, such a method is not flexible to various test scenarios that may be unfolded under real use conditions, and costs too much to secure the scenarios corresponding to various cases. Accordingly, it consumes time and manpower wastefully, and it is difficult to perform an accurate test.

SUMMARY

Additional aspects and/or advantages will be set forth in part in the description which follows and, in part, will be apparent from the description, or may be learned by practice of the invention.

One or more exemplary embodiments may provide an automatic testing apparatus of embedded software, the automatic testing apparatus including: a keyword composer which extracts a keyword from status information output by executing the embedded software, and composes a keyword list using the extracted keywords; an output analyzer which analyzes the output from the execution of the embedded software based on the composed keyword list; a control command generator which loads at least one scenario previously stored in accordance with the analysis results, and generates an instruction list corresponding to a predetermined event status; and a test processor which processes the embedded software to reproduce the event status based on the generated instruction list.

The control command generator may use the instruction list to compose a scenario corresponding to the event status.

The composed scenario may include a predetermined-form programming language where at least one instruction included in the instruction list is used as an instruction for executing the embedded software.

The programming language may support at least one of multiple selective sentences, a repetitive sentence and a comparative sentence.

The automatic testing apparatus may further include a storage unit to store the composed scenario.

The control command generator may generate an instruction list including an instruction corresponding to a possible event status, based on at least one of a keyword included in the keyword list and the loaded scenario.

The control command generator may load a plurality of previously stored scenarios in preset order or randomly.

The control command generator may determine whether an error occurs or not in accordance with the reproduction results.

The control command generator may update the instruction list by branching into an instruction corresponding to a new event status in accordance whether the error occurs or not.

The status information may be collected by the keyword composer as the embedded software is executed and may be in the form of a log file. The output analyzer may use one or more keywords from the keyword list as an output condition, and the control command generator may load a scenario based on the output condition.

The test processor may be provided in a digital device to which the embedded software is loaded, and the keyword composer, the output analyzer and the control command generator may be provided in a host apparatus connecting with the digital device.

The keyword composer, the output analyzer, the control command generator and the test processor may be provided in a digital device to which the embedded software is loaded.

One or more exemplary embodiments may provide an automatic testing method for embedded software, including: extracting a keyword from status information output by executing the embedded software, and composing a keyword list using the extracted keywords; analyzing the output from the execution of the embedded software based on the composed keyword list; loading at least one scenario previously stored in accordance with the analysis results, and generating an instruction list corresponding to a predetermined event status; and processing the embedded software to reproduce the event status based on the generated instruction list.

The automatic testing method may further include composing a scenario corresponding to the event status, using the instruction list.

The composed scenario may include a predetermined-form programming language where at least one instruction included in the instruction list is used as an instruction for executing the embedded software.

The programming language may support at least one of multiple selective sentences, a repetitive sentence and a comparative sentence.

The automatic testing method may further include storing the composed scenario.

The generating the instruction list may include generating an instruction list including an instruction corresponding to a possible event status, based on at least one of a keyword included in the keyword list and the loaded scenario.

The generating the instruction list may include loading a plurality of previously stored scenarios in preset order or randomly.

The automatic testing method may further include determining whether an error occurs or not in accordance with the reproduction results.

The automatic testing method may further include updating the instruction list by branching into an instruction corresponding to a new event status in accordance whether the error occurs or not.

One or more exemplary embodiments may provide a test scenario composing method for embedded software, the method including: extracting a keyword from status information output by executing the embedded software, and composing a keyword list using the extracted keywords; analyzing the output from the execution of the embedded software based on the composed keyword list; loading at least one scenario previously stored in accordance with the analysis results, and generating an instruction list corresponding to a predetermined event status; and composing a scenario for testing the embedded software, based on the generated instruction list.

The composed scenario may include a predetermined-form programming language where at least one instruction included in the instruction list is used as an instruction for executing the embedded software.

The programming language may support at least one of multiple selective sentences, a repetitive sentence and a comparative sentence.

One or more exemplary embodiments may provide an automatic testing method for embedded software, the method including: loading a pre-stored first scenario to test the embedded software; generating an instruction list including a first instruction; implementing a test of reproducing a first predetermined event status using the generated instruction list; and automatically composing a second scenario based on the first instruction, to test the embedded software corresponding to a second predetermined event status.

BRIEF DESCRIPTION OF THE DRAWINGS

The above and/or other aspects will become apparent and more readily appreciated from the following description of exemplary embodiments, taken in conjunction with the accompanying drawings, in which.

DETAILED DESCRIPTION

Below, exemplary embodiments will be described in detail with reference to accompanying drawings, so as to be easily realized by a person having ordinary knowledge in the art. The exemplary embodiments may be embodied in various forms without being limited to the exemplary embodiments set forth herein. Descriptions of well-known parts are omitted for clarity, and like reference numerals refer to like elements throughout.

Figure 1:
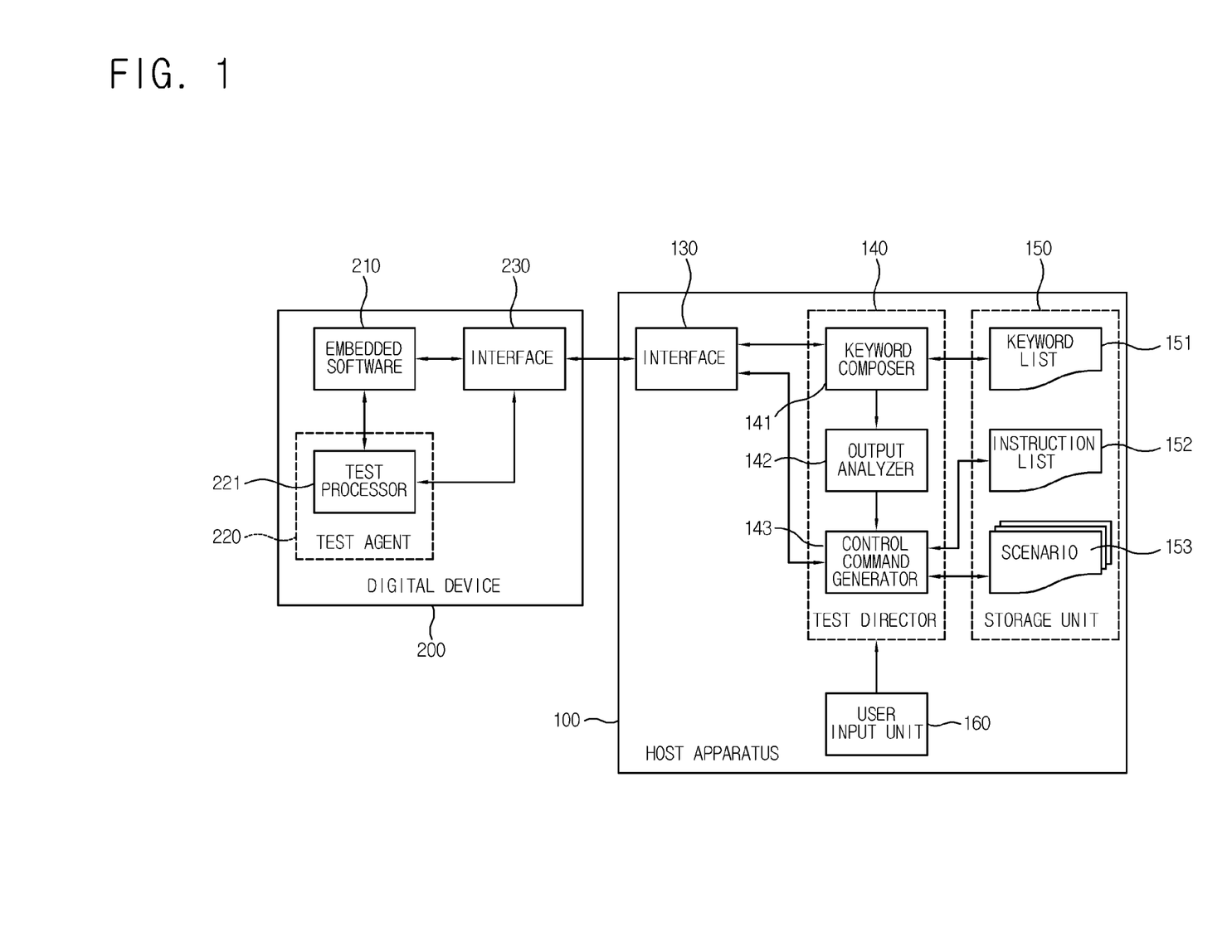
FIG. 1 is a block diagram showing a configuration of an automatic testing apparatus according to an exemplary embodiment.

FIG. 1 is a block diagram showing a configuration of an automatic testing apparatus according to an exemplary embodiment.

As shown in FIG. 1, the automatic testing apparatus according to an exemplary embodiment may include a test director 140 and a test agent 220.

The test agent 220 may be built on a digital device 200 to be tested, and the test director 140 may be built on a host apparatus 100 which controls the whole testing process. The host apparatus 100 may be achieved or embodied by a personal computer (PC). For example, if embedded software built on an image processing apparatus such as a television (TV) is tested, the TV may be connected to the PC in order to perform the test. Under such a scenario, the TV may correspond to the digital device 200, and the PC may correspond to the host apparatus 100. Also, the digital device 200 becomes (or may correspond to) a target as a real environment where the embedded software is finally installed and runs.

The digital device 200 may not include only the image processing apparatus but also may include various devices such as an audio player, a mobile phone or the like, which can process and output an audio signal received from the exterior or stored in the interior. If the digital device 200 may be rendered by or embodied by the image processing apparatus, it may include an image processor for processing an image signal received from an external image supplying source under a preset imaging process.

Meanwhile, as shown in FIG. 1, the host apparatus 100 may further include a storage unit 150 for storing non-limited data/information, and a user input unit 160 for allowing a user to input his/her command.

The storage unit 150 may be rendered by or embodied by a non-volatile storage medium such as a flash memory, a hard disk drive, etc., and may be provided inside or outside the host apparatus 100. If the storage unit 150 is provide in the outside (externally), a connector (not shown) may be provided to connect with the storage unit 150. The storage unit 150 is accessed by the test director 140, and applies operations including reading, recording, modification, deletion, and/or updating and the like to data. In an example embodiment, the storage unit 150 stores and reads a keyword list 151, an instruction list 152 and a plurality of scenarios 153.

The user input unit 160 may be rendered by or embodied by a keyboard, a mouse, a graphic user interface (GUI), and combinations thereof. The user input unit 160 may also be embodied by a touchscreen and/or voice control unit which may receive voice commands. However, the above-mentioned devices are merely representative devices which may be used independently or in combination with one another and the disclosure is not limited thereto. In an example embodiment, the test director 140 may test embedded software 210 based on a user command input through the user input unit 160.

The storage unit 150 and the user input unit 160 may be included in the automatic testing apparatus according to an exemplary embodiment.

In an example embodiment, the host apparatus 100 and the digital device 200 perform data communication with each other through input/output interfaces (I/O Interface) 130, 230, and automatically test the embedded software. Here, the I/O interfaces 130, 230 may include serial, Ethernet, USB, or the like standard I/O interfaces. Generally, the host apparatus 100 and digital device 200 may perform communication over a wired or wireless network, or a combination thereof.

The test agent 220 provided in the digital device 200 gives or provides environments for implementing the test in the digital device 200. For example, the embedded software 210 installed in the digital device 200 may be implemented by the test agent 220 under each test scenario. Here, the test agent 220 may be rendered by or embodied by a control processing unit (CPU), a micro control unit (MCU), etc., thereby controlling the functions of the digital device 200 or providing a user interface (UI).

In an example embodiment, the test agent 220 may include a test processor 221 for processing the embedded software 210 to reproduce a predetermined event status based on the instruction list 152 generated by the test director 140.

The test director 140 may refer to a test management engine to control the test agent 220 to perform a test so that the embedded software 210 can reproduce a predetermined event. The test director 140 gives (provides or transmits) a command that the test agent 220 regarding the test. For example, the test director 140 may command that the test agent 220 start, stop, and/or complete the test, or other like commands. Thus, the test agent 220 performs each test by reproducing a corresponding event status in response to the received command.

The test director 140 in an example embodiment may be rendered by or embodied by the CPU, the MCU, etc., and controls operations of the host apparatus 100. For example, the test director 140 controls data communication through the I/O interfaces 130, and performs operations corresponding to a user's command input through the user input unit 160.

The test director 140 is reported about a test running state or a test running result from the test agent 220, and monitors it. That is, the test director 140 may receive reports about a test running state or a test running result from the test agent 220, and the test director 140 may monitor the test. Here, the monitoring may include generally managing a test status and making a report, or controlling the test if the test is not smoothly proceeded. That is, the test director 140 may manage a test status, may request a report regarding the test status, and may control the test, by monitoring the test. For example, the test agent 220 may report the running results to the test director 140 every time when each event reproduction is completed. If the test director 140 is not reported about (e.g., does not receive reports) the event reproduction within a preset time, the test director 140 determines that an error occurs, and commands the test agent 220 to make a report about a hitherto running result or resume the corresponding event.

The test director 140 in an example embodiment builds the test agent 220 and the embedded software 210 together, and ports them to the digital device 100. For running the test, the test director 140 may transmit an individual instruction list through the I/O interfaces 130 and 230 so that the embedded software 210 can reproduce various event statuses.

Hereinafter, detailed testing operations of the test director 140 and the test agent 220 will be described with reference to FIG. 1.

As shown in FIG. 1, the test director 140 may include a keyword composer 141, an output analyzer 142 and a control command generator 143.

The keyword composer 141 collects status information output as the embedded software 210 is executed, extracts a keyword from the collected status information, and composes a keyword list 151 based on the extracted keyword list 151. The composed keyword list 151 may be stored in the storage unit 150. Here, the embedded software 210 may be executed under control of the test agent 220, and the status information may be used as a log file.

The status information becomes the log file where execution history of the embedded software 210 is recorded. Also, the collected status information may include status information output in accordance with events reproduced by the embedded software 210 based on the instruction list 152 to be described later.

The output analyzer 142 analyzes the output (e.g., standard output) from execution of the embedded software 210 based on the composed keyword list 151. Here, the keyword list 151 may be used to analyze the status of the embedded software 210 in real time.

The control command generator 143 loads at least one scenario previously stored in accordance with analysis results of the output analyzer 142, and generates the instruction list 152 corresponding to a predetermined event status. The output analyzer 142 may determine the trueness/falseness of a result or condition by using the keyword list 151 as a status condition (i.e., an inquiry), and loads a scenario satisfying the corresponding condition.

For example, if the digital device 200 is an audio player and 'power on' and 'play' are sequentially extracted as keywords, the keyword composer 141 composes the keyword list 151 including 'play (keyword A)' and the output analyzer 142 uses and analyzes the keyword list 151 as an output for playing an audio file. A control command generator 143 may load a scenario (for convenience, called a scenario A), which plays the audio file stored in a storage medium (e.g., a hard disk drive (HDD)) inside the audio player, as one of the scenarios on conditions of playing. Here, the control command generator 143 may load a plurality of previously stored scenarios (the scenarios A, B, . . . N) related to the play of the audio files in a preset order or randomly.

The control command generator 143 uses the loaded scenario to generate the instruction list 152 corresponding to a predetermined event status. That is, the control command generator 143 generates the instruction list including an instruction corresponding to the event status that may occur, based on at least one among the loaded scenario and the keyword included in the keyword list 151. That is, the control command generator 143 may generate an instruction list including an instruction corresponding to an event status, using the loaded scenario and/or the keyword included in the keyword list 151. For example, if the scenario A is loaded, the control command generator 143 may generate the instruction list 152 including the instruction A corresponding to the event where the embedded software 210 reproduces the audio file stored in the internal storage medium.

The generated instruction list 152 may be transmitted to the test processor 221 of the test agent 220 loaded in the digital device 200 through the I/O interfaces 130, 230, and the test processor 221 may control the embedded software 210 to perform a test for reproduction of the corresponding event status (e.g., playing the audio file stored in the internal storage medium), based on the received instruction list 152.

The status information from the reproduction results may be transmitted to the host apparatus 100 through the I/O interfaces 230, 130 in the form of a log file.

As described above, the keyword composer 141 collects the status information based on the reproduction results and composes the keyword list 151, and the output analyzer 142 analyzes an output corresponding to the event reproduction. The control command generator 143 determines whether there is an error in the results of the event reproduction, based on the analysis results of the output analyzer 142. Further, the control command generator 143 may update the instruction list 152 by branching an instruction corresponding to a new event status in accordance with whether the error occurs or not.

For example, if there is no error as a result of reproducing the audio file stored in the internal storage medium, another scenario on a condition of keyword A (play) (e.g., a scenario (for convenience, called a scenario B) that plays the audio file stored in a compact disc (CD)) is loaded, and the updated instruction list may be generated including an instruction corresponding to an event of playing an audio file stored in the CD using the loaded scenario B.

The instruction list 152 may be transmitted to the digital device 200 via the I/O interfaces 130, 230, and the test processor 221 may control the embedded software 210 to perform a test for reproduction of the corresponding event status (playing the audio file stored in the CD) based on the received instruction list 152.

Meanwhile, the control command generator 143 may terminate the test of the embedded software 210 if the analysis result of the output analyzer 142 shows an error in the event reproduction. Here, a developer may select whether to terminate the test through the user input unit 160.

If it is selected to terminate the test, a developer may perform an analysis for solving the error that occurs while executing the embedded software 210.

On the other hand, if it is selected not to terminate the test, the test director 140 may continue to collect and extract the keywords based on the status information received through the I/O interface 130.

Thus, the automatic testing apparatus according to an exemplary embodiment sequentially or randomly executes various events in accordance with the status information of the embedded software 210, and previously detects predictable or unpredictable various problems that may arise under various user conditions, thereby reproducing them. That is, the automatic testing apparatus reproduces various scenarios in order to detect and/or solve error conditions that may arise when a user uses a device.

Also, various events are branched in accordance with determination about whether a status condition about the extracted keyword is true or false, thereby performing repetitive tests.

Meanwhile, the control command generator 143 may compose or generate the scenario 153 that uses the generated instruction list 152 to test the embedded software 210 corresponding to a predetermined event status. Here, the scenario may include at least one keyword included in the keyword list 151, the loaded scenario and at least one instruction included in the generated instruction list 152. The generated scenario 153 is stored in the storage unit 150.

Figure 2:
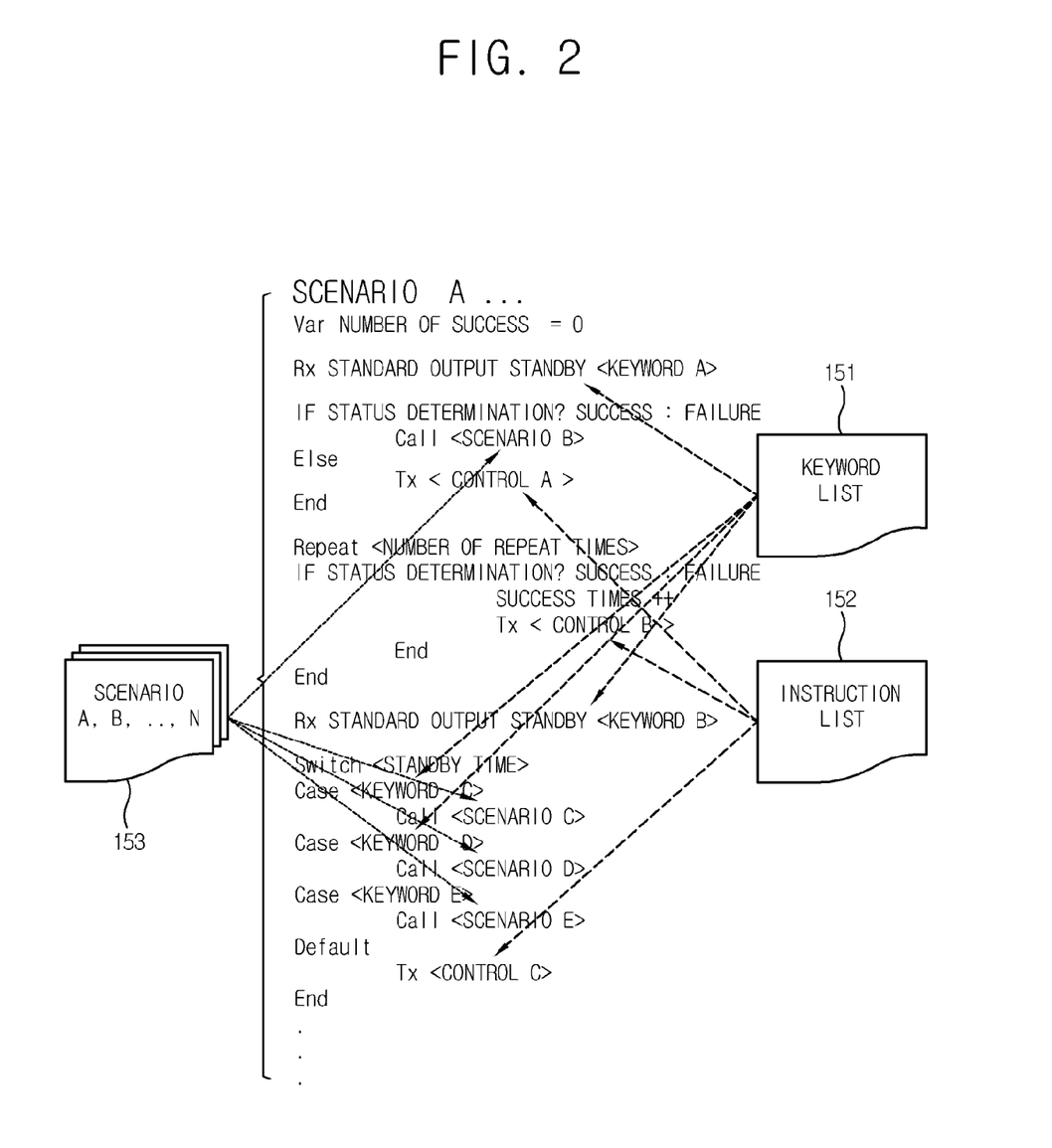
FIG. 2 shows an example of a scenario composed according to an exemplary embodiment.

As shown in FIG. 2, the scenario according to an exemplary embodiment includes at least one command included in the instruction list 152 (a predetermined-form programming language (hereinafter, referred to as a "scenario language") that uses <control A>, <control B>, <control C>) as an instruction for executing the embedded software 110). The programming language may use the status information (<keyword A>, <keyword B>) of the embedded software 210 as conditions, and support at least one of a multiple selective sentence (case <keyword C> call <the scenario C>, case <keyword D> call <the scenario D>, case <keyword E> call <the scenario E>), repetitive sentence (Repeat <number of repeat times>), and a comparative sentence (if status determination? Success:failure).

In an example embodiment, the scenario (scenarios A, B, . . . , N) may be composed so that the embedded software 210 can perform an automatic test by referring to a control command list 152 corresponding to each case that may occur in the embedded software 210 under a condition of the keyword list 151 based on the status information of the embedded software 210 as shown in FIG. 2.

While the scenario 153 may be branched in accordance with various conditions, a new scenario may be continuously composed until a developer issues a command to stop composing the scenario (or a command terminating a test).

The test agent 220 in an example embodiment may report an event running status or result to the test director 140. The test director 140 may be reported about or receive a report regarding a test operating status or a result from the test agent 220, and make a report on managing a general test status or a report that the test is not smoothly proceeded. That is, the test director may report to the user a general test status or that an error has been encountered during the test, based on the report received from the test agent 220. The developer ascertains the report and confirms an automatic test result about the embedded software 210.

Figure 3:
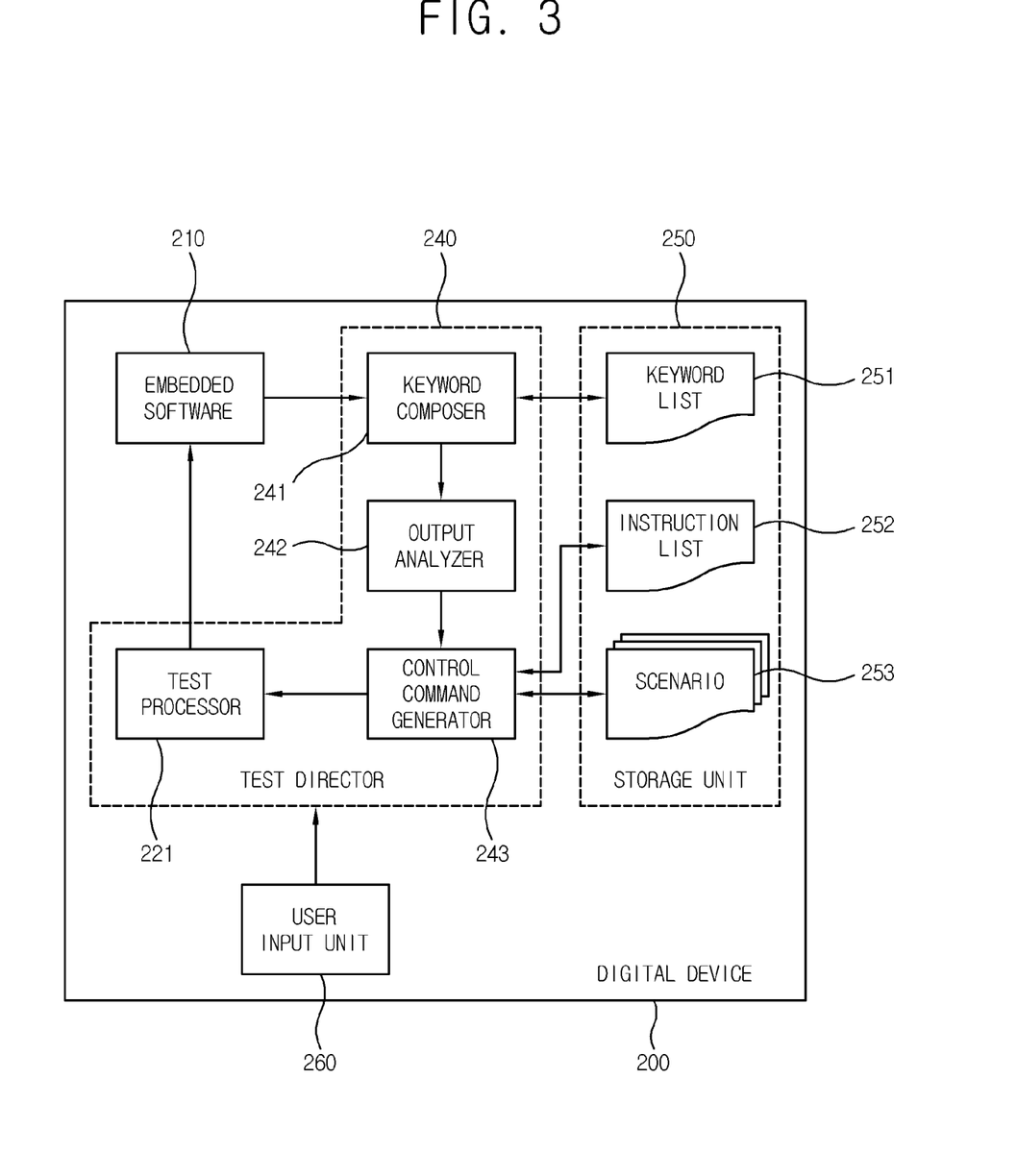
FIG. 3 is a block diagram showing a configuration of an automatic testing apparatus according to another exemplary embodiment.

An automatic testing apparatus according to another exemplary embodiment as shown in FIG. 3 is distinguishable from that shown in FIG. 1 in that a test director 240 is loaded in the digital device 200 and the digital device 200 includes a storage unit 250 and a user input unit 260. Therefore, detailed descriptions of the embedded software 210, the storage unit 250 and the user input unit 260 are the same as those described above and thus will be omitted to avoid repetitive descriptions.

As shown in FIG. 3, the automatic testing apparatus in an example embodiment includes a test director 240 which is loaded in a real environment target, i.e., the digital device 200 where the embedded software 210 is installed and operated, and tests the embedded software 210. Therefore, there is no need of I/O interfaces, and the test director 240 may include the test processor 221. That is, the digital device 200 may include an I/O interface, however the I/O interface is not necessary for communication between the test director 240 and the digital device 200.

In the exemplary embodiment shown in FIG. 3, the test director 240 includes the test processor 221, but is not limited thereto. Alternatively, a separate test agent may be provided in the digital device 200 so that the test agent can reproduce each event status under control of the test director 240 and perform a corresponding test.

The automatic testing apparatus in this exemplary embodiment may further include a storage unit 250 to store a keyword list 251, an instruction list 252 and a scenario 253, and a user input unit 260 to receive a user's command.

As shown in FIG. 3, the test director 240 may include a keyword composer 241, an output analyzer 242, a control command generator 243 and a test processor 221.

The keyword composer 241 collects the status information output as the embedded software 210 is executed, extracts keywords from the collected status information, and composes the keyword list 251 based on the extracted keywords.

The output analyzer 242 analyzes the output (e.g., standard output) as the embedded software 210 is executed, based on the composed keyword list 251.

The control command generator 243 loads at least one scenario previously stored in accordance with analysis results of the output analyzer 242, and generates the instruction list 252 corresponding to a predetermined event status. The output analyzer 242 may determine the trueness/falseness of a result or condition, using the keyword list 251 as a status condition, and loads a scenario satisfying the corresponding condition.

The control command generator 243 uses the loaded scenario to generate the instruction list 252 corresponding to a predetermined possible event status.

The test processor 221 controls the embedded software 210 to perform a test for reproducing a corresponding event status (e.g., reproducing an audio file stored in an internal storage medium), based on the generated instruction list 252.

The keyword composer 241 composes the keyword list 251 by collecting the status information from results of reproducing the event, and the output analyzer 242 analyzes the output corresponding to the event reproduction. The control command generator 253 determines whether there is an error in results from reproducing an event, based on the analysis results of the output analyzer 242. Further, the control command generator 253 may update the instruction list 252 by branching an instruction corresponding to a new event status in accordance with whether an error occurs or not. Further, the test processor 221 controls the embedded software 210 to perform a test for reproducing the next event status (e.g., reproducing an audio file stored in a CD), based on the updated instruction list 252.

Meanwhile, the control command generator 243 may terminate the test of the embedded software 210 if the output analyzer 242 analyzes that an error occurs in the results from reproducing the event. Here, a developer may use the user input unit 260 to select whether to terminate the test.

If it is selected to terminate the test, a developer uses the report for conducting an analysis to solve an error that occurs while running the embedded software 210. If it is selected not to terminate the test, the test director 240 continues to collect and extract the keywords based on the status information.

Meanwhile, the control command generator 243 may compose or generate the scenario 253 as shown in FIG. 3 through the generated instruction list 252. Here, the scenario may include at least one keyword included in the keyword list 251, the loaded scenario and at least one instruction included in the generated instruction list 252. Also, the scenario may include a predetermined-form programming language (i.e., a scenario language) that uses at least one instruction included in the instruction list 252 as an instruction for executing the embedded software 210. The programming language may use the status information of the embedded software 210 as conditions, and may support at least one among multiple selective sentences, a repetitive sentence and a comparative sentence.

While the scenario 253 may be branched in accordance with various conditions, a new scenario may be continuously composed until a developer issues a command to stop composing the scenario (or a command terminating a test).

The test director 240 in an example embodiment may make or issue a report by generally managing a test status in accordance with test running status or results, and may make or issue a report if the test is not smoothly proceeded. That is, the test director 240 may report to the user a general test status or that an error has been encountered during the test, based on the report received from the output analyzer 242 if the output analyzer determines that an error has occurred. The developer ascertains the report and confirms an automatic test result about the embedded software 210.

The automatic testing apparatus in the above-described example exemplary embodiment with respect to FIG. 3 may use not a separate host apparatus but only the test director 240 loaded to the digital device 200, thereby enabling the automatic test of the embedded software 210 with regard to each event status.

Below, the scenario composing method and the automatic testing method of the embedded software with respect to the example embodiments disclosed herein will be described with reference to FIGS. 4 and 5.

Figure 4:
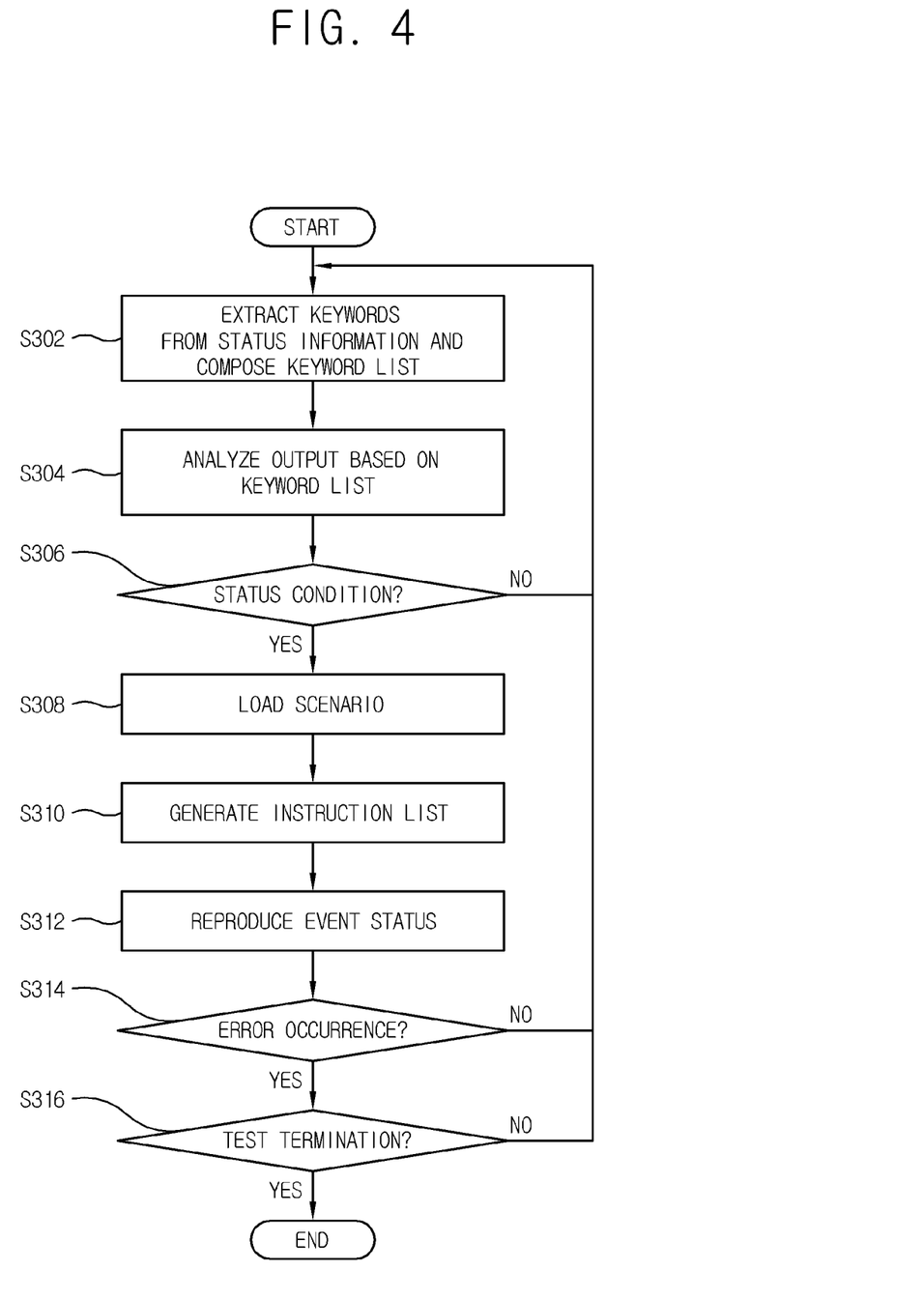
FIG. 4 is a flowchart showing an automatic testing method of embedded software according to an exemplary embodiment.

FIG. 4 is a flowchart showing an automatic testing method of embedded software according to an exemplary embodiment.

As shown in FIG. 4, the keyword composer 141, 241 extracts keywords from the status information output by executing the embedded software 210, and composes a keyword list 151, 251 (S302).

The output analyzer 142, 242 analyzes the output from the execution of the embedded software 210 based on the keyword list 151, 251 composed at the operation S302 (S304).

In accordance with the analysis results at the operation S304, a control command generator 143, 243 determines the trueness/falseness of a result or condition (YES/NO) by using the keyword list 151 as a status condition (i.e., an inquiry) (S306).

If it is determined at the operation S306 that the keyword of the keyword list 151, 251 satisfies the status condition, the control command generator 143, 243 loads at least one of the previously stored scenarios (S308).

Further, the control command generator 143, 243 uses the scenario loaded at the operation S308 and generates an instruction list 152, 252 corresponding to a predetermined event status (S310).

The instruction list 152, 252 generated at the operation S310 is transmitted to the test processor 221, and a test processor 221 controls the embedded software 210 to implement a test of reproducing a predetermined event status based on the instruction list 152, 252 (S312). Here, the test processor may be disposed together with a test agent 220 as shown in FIG. 1, or disposed together with a test director 240 as shown in FIG. 3, for example.

The status information corresponding to the event reproduction at the operation S312 is collected by the keyword composer 141, 241, and thus composed into the keyword list 151, 251. The output analyzer 142, 242 determines whether an error occurs in event reproduction, based on the analysis results (S314).

If it is determined that the error occurs at the operation S314, a developer may select whether or not to terminate the test (S316).

If it is determined that the error does not occur at the operation S314 and it is selected not to terminate the test at the operation S316, the operations S302 to S312 are repeated to thereby branch an instruction corresponding to a new event status and update the instruction list 152, 252. In this manner, the embedded software is automatically tested by reproducing various events.

Figure 5:
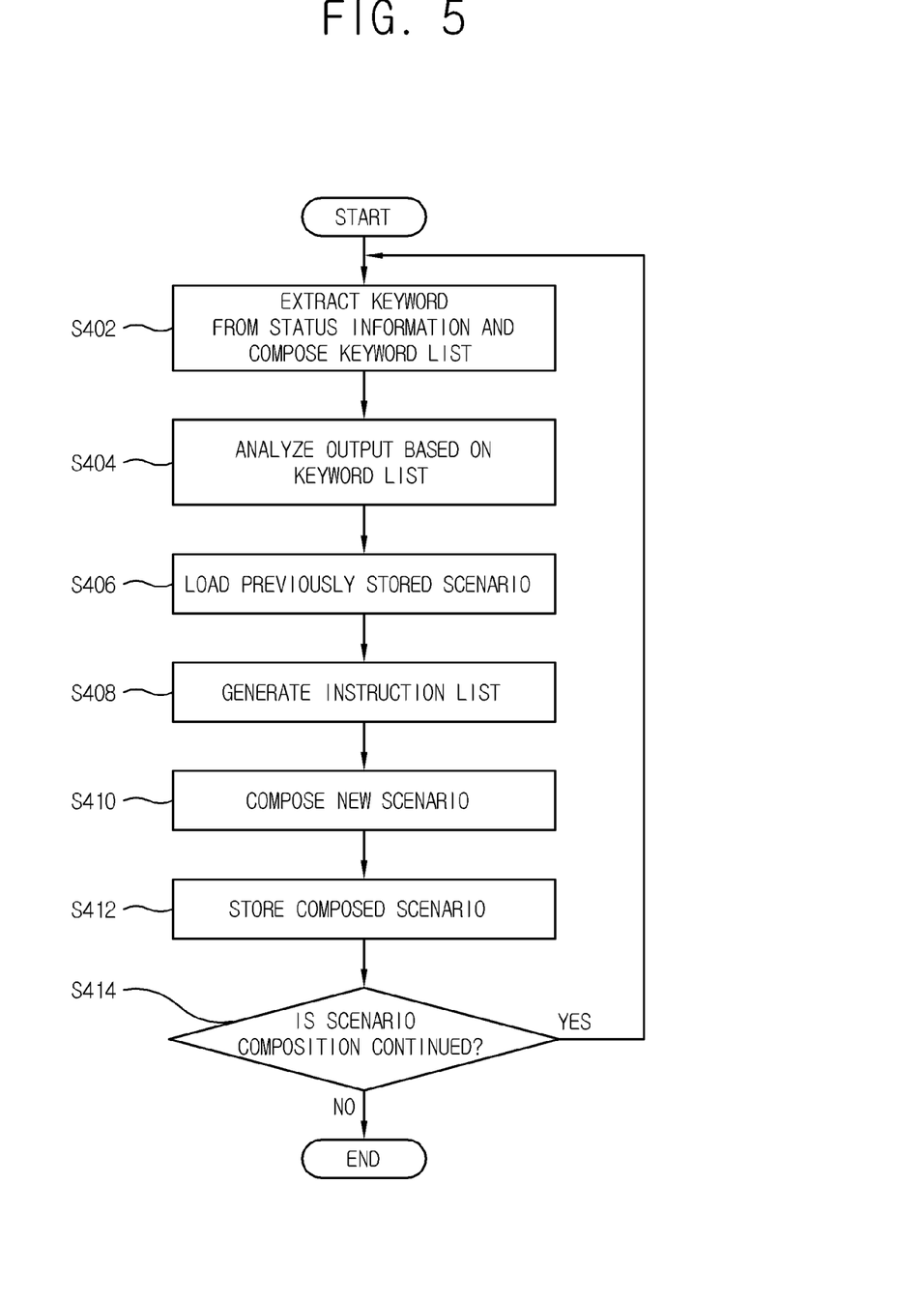
FIG. 5 is a flowchart showing a test scenario composing method of the embedded software according to an exemplary embodiment.

FIG. 5 is a flowchart showing a test scenario composing method of the embedded software according to an exemplary embodiment.

As shown in FIG. 5, the keyword composer 141, 241 composes the keyword list 151, 251 by extracting a keyword from the status information output by executing the embedded software 210 (S402).

The output analyzer 142, 242 analyzes the output from the execution of the embedded software 210 based on the keyword list 151, 251 composed at the operation S402 (S404).

In accordance with the analysis results at the operation S404, the control command generator 143, 243 determines the trueness/falseness of a result or condition (YES/NO) by using the keyword list 151 as a status condition (i.e., an inquiry), and loads at least one of the previously stored scenarios where the keyword list 151, 251 satisfies the status condition (S406).

Further, the control command generator 143, 243 uses the scenario loaded at the operation S406 and generates an instruction list 152, 252 corresponding to a predetermined event status (S408).

Further, the control command generator 143, 243 uses the instruction list 152, 252 generated at the operation S408 and composes a new scenario to test the embedded software 210 in accordance with a predetermined event status (S410). The composed scenario includes a predetermined-form programming language (i.e., a scenario language) that uses at least one instruction included in the instruction list 152, 252 as an instruction for executing the embedded software, and the programming language may support at least one among multiple selective sentences, a repetitive sentence and a comparative sentence.

For example, digital device 200 may correspond to an audio player. The control command generator 143, 243 may load scenario A which plays an audio file stored in a hard disk drive (HDD) which may disposed within the audio player or external to the audio player, as one of the scenarios on conditions of playing. If there is no error as a result of reproducing the audio file stored in the HDD, another scenario on a condition of keyword may be loaded. That is, a second scenario may automatically be loaded. For example, the control command generator 143, 243 may load scenario B which plays an audio file audio file stored in a compact disc (CD), and the updated instruction list may be generated including an instruction corresponding to an event of playing an audio file stored in the CD using the loaded scenario B.

The scenario composed at the operation S410 may be stored in the storage unit 150, 250 (S412).

A developer may select whether the control command generator 143, 243 continues to compose the scenario (S414). In accordance with the selection results at the operation S414, scenario 153, 253 is branched depending on conditions and thus a new scenario may be continuously composed, thereby composing the scenario until a developer issues a command to stop composing the scenario (or a command to terminate the test).

Thus, according to an exemplary embodiment, the automatic testing apparatus uses all the status information output by executing the embedded software as an inquiry, and sequentially or randomly executes various events, thereby previously detecting an unpredictable problem as well as a predictable problem that may occur under user's conditions and reproduce it. That is, the automatic testing apparatus reproduces various scenarios in order to detect and/or solve error conditions that may arise when a user uses a device to reproduce content (e.g., audio, video, and/or other media content).

Also, various events are branched in accordance with a trueness/falseness result or condition regarding the status conditions about the extracted keyword, so that the embedded software may repetitively experience the automatic test.

Also, the test scenario may be continuously branched into a new scenario in accordance with conditions until a developer issues a command to stop composing the scenario, so that various test scenarios can be secured.

The apparatuses and methods according to the above-described example embodiments may use one or more processors, which may include a microprocessor, central processing unit (CPU), digital signal processor (DSP), or application-specific integrated circuit (ASIC), as well as portions or combinations of these and other processing devices.

The terms "module", and "unit," as used herein, may refer to, but are not limited to, a software or hardware component or device, such as a Field Programmable Gate Array (FPGA) or Application Specific Integrated Circuit (ASIC), which performs certain tasks. A module or unit may be configured to reside on an addressable storage medium and configured to execute on one or more processors. Thus, a module or unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules/units may be combined into fewer components and modules/units or further separated into additional components and modules.

Each block of the flowchart illustrations may represent a unit, module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The apparatuses and methods according to the above-described embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, USB memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa. In addition, a non-transitory computer-readable storage medium may be distributed among computer systems connected through a network and computer-readable codes or program instructions may be stored and executed in a decentralized manner. In addition, the computer-readable storage media may also be embodied in at least one application specific integrated circuit (ASIC) or Field Programmable Gate Array (FPGA).

Although a few exemplary embodiments have been shown and described, it will be appreciated by those skilled in the art that changes may be made to these exemplary embodiments without departing from the principles and spirit of the invention, the scope of which is defined in the appended claims and their equivalents.

What is claimed is:

1. An automatic testing apparatus of embedded software, the automatic testing apparatus comprising:
    a keyword composer to collect status information output by executing the embedded software, to extract one or more keywords corresponding to a predetermined event from the status information, and to compose a keyword list using the extracted one or more keywords;
    an output analyzer to analyze the output from the execution of the embedded software to determine the predetermined event, based on the composed keyword list;

a control command generator to load at least one scenario previously stored in accordance with the analysis results, and to generate an instruction list corresponding to the predetermined event; and a test processor to process the embedded software to reproduce the predetermined event based on the generated instruction list, wherein the control command generator uses the instruction list to compose a scenario corresponding to the predetermined event.

2. The automatic testing apparatus according to claim 1, wherein the composed scenario comprises a predetermined-form programming language where at least one instruction included in the instruction list is used as an instruction for executing the embedded software.

3. The automatic testing apparatus according to claim 2, wherein the programming language supports at least one of multiple selective sentences, a repetitive sentence and a comparative sentence.

4. The automatic testing apparatus according to claim 1, further comprising a storage unit to store the composed scenario.

5. The automatic testing apparatus according to claim 1, wherein the control command generator generates an instruction list comprising an instruction corresponding to a possible event, based on at least one of a keyword included in the keyword list and the loaded scenario.

6. The automatic testing apparatus according to claim 1, wherein the control command generator loads a plurality of previously stored scenarios in a preset order or randomly.

7. The automatic testing apparatus according to claim 1, wherein the control command generator determines whether an error occurs in accordance with the reproduction results.

8. The automatic testing apparatus according to claim 7, wherein the control command generator updates the instruction list by branching into an instruction corresponding to a new event status in accordance with whether the error occurs.

9. The automatic testing apparatus according to claim 1, wherein the test processor is provided in a digital device to which the embedded software is loaded, and the keyword composer, the output analyzer and the control command generator are provided in a host apparatus connected to the digital device.

10. The automatic testing apparatus according to claim 1, wherein the keyword composer, the output analyzer, the control command generator and the test processor are provided in a digital device to which the embedded software is loaded.

11. The automatic testing apparatus according to claim 1, wherein the status information is collected by the keyword composer as the embedded software is executed and is in the form of a log file.

12. The automatic testing apparatus according to claim 1, wherein the output analyzer uses one or more keywords from the keyword list as an output condition, and the control command generator loads a scenario based on the output condition.

13. An automatic testing method for embedded software, comprising:

collecting status information output by executing the embedded software;

extracting one or more keywords corresponding to a predetermined event from the status information, and composing a keyword list using the extracted one or more keywords;

analyzing the output from the execution of the embedded software to determine the predetermined event, based on the composed keyword list;

loading at least one scenario previously stored in accordance with the analysis results, and generating an instruction list corresponding to the predetermined event;

processing the embedded software to reproduce the predetermined event based on the generated instruction list; and composing a scenario corresponding to the predetermined event, using the instruction list.

14. The automatic testing method according to claim 13, wherein the composed scenario comprises a predetermined-form programming language where at least one instruction included in the instruction list is used as an instruction for executing the embedded software.

15. The automatic testing method according to claim 14, wherein the programming language supports at least one of multiple selective sentences, a repetitive sentence and a comparative sentence.

16. The automatic testing method according to claim 13, further comprising storing the composed scenario.

17. The automatic testing method according to claim 13, wherein the generating the instruction list comprises generating an instruction list comprising an instruction corresponding to a possible event, based on at least one of a keyword included in the keyword list and the loaded scenario.

18. The automatic testing method according to claim 13, wherein the generating the instruction list comprises loading a plurality of previously stored scenarios in a preset order or randomly.

19. The automatic testing method according to claim 13, further comprising determining whether an error occurs in accordance with the reproduction results.

20. The automatic testing method according to claim 19, further comprising updating the instruction list by branching into an instruction corresponding to a new event in accordance with whether the error occurs.

21. The automatic testing method according to claim 13, further comprising collecting status information as the embedded software is executed, wherein the status information is in the form of a log file.

22. The automatic testing method according to claim 13, wherein the analyzing comprises using one or more keywords from the keyword list as an output condition, and the loading comprises loading a scenario based on the output condition.

23. A test scenario composing method for embedded software, the method comprising:

collecting status information output by executing the embedded software;

extracting one or more keywords corresponding to a first event from the status information, and composing a keyword list using the extracted one or more keywords;

analyzing the output from the execution of the embedded software to determine the first event, based on the composed keyword list;

loading at least one scenario previously stored in accordance with the analysis results, and generating an instruction list corresponding to the first event;

reproducing the first event based on the generated instruction list;

composing a new scenario corresponding to a second event which is different from the first event for testing the embedded software, based on the generated instruction list;

reproducing the second event based on the generated instruction list.

24. The test scenario composing method according to claim 23, wherein the composed scenario comprises a predetermined-form programming language where at least one instruction included in the instruction list is used as an instruction for executing the embedded software.

25. The test scenario composing method according to claim 24, wherein the programming language supports at least one of multiple selective sentences, a repetitive sentence and a comparative sentence.

26. An automatic testing method for embedded software, comprising:
- collecting status information output by executing the embedded software;
- loading a pre-stored first scenario corresponding to a first predetermined event to test the embedded software from the status information;
- generating an instruction list corresponding to the first predetermined event including a first instruction;
- implementing a test reproducing the first predetermined event using the generated instruction list;
- automatically composing a second scenario based on the first instruction, to test the embedded software corresponding to a second predetermined event which is different from the first predetermined event; and
- implementing another test reproducing the second predetermined event based on the generated instruction list.

* * * * *